United States Patent [19]
Kikinis

[11] Patent Number: 5,532,719
[45] Date of Patent: Jul. 2, 1996

[54] REMOTE CONTROL OF DISPLAY FUNCTIONS

[75] Inventor: Dan Kikinis, Saratoga, Calif.

[73] Assignee: Cordata, Inc., Tortola, Virgin Islands (Br.)

[21] Appl. No.: 515,384

[22] Filed: Aug. 14, 1995

Related U.S. Application Data

[63] Continuation of Ser. No. 181,884, Jan. 14, 1994, abandoned.

[51] Int. Cl.$^6$ ............................. G09G 1/00; G09G 1/28; G09G 1/06
[52] U.S. Cl. ............................................ 345/211; 345/212
[58] Field of Search .......................... 345/211–213, 902, 345/904; 348/177–181, 184, 185, 189–191, 460, 473, 476–479; 358/147

[56] References Cited

U.S. PATENT DOCUMENTS

| | | | |
|---|---|---|---|
| 3,927,250 | 12/1975 | Rainger | 348/473 |
| 4,312,015 | 1/1982 | Montminy et al. | 348/180 |
| 4,774,580 | 9/1988 | Miyasako | 348/478 |
| 4,851,826 | 7/1989 | Davis | 345/132 |
| 4,897,721 | 1/1990 | Young et al. | 348/190 |
| 4,920,503 | 4/1990 | Cook | 348/479 |
| 5,298,993 | 3/1994 | Edgar et al. | 348/180 |

FOREIGN PATENT DOCUMENTS 0404182 12/1990 European Pat. Off. ............... 345/212

OTHER PUBLICATIONS

VESA Display Definition Protocol (VDDP), Proposal Draft 5.05, Jul. 24, 1992 Entire Document.

*Primary Examiner*—Jeffery Brier
*Attorney, Agent, or Firm*—Donald R. Boys

[57] ABSTRACT

A system for making display adjustments in a monitor connected to a general-purpose computer converts user inputs at the host computer to digital commands and data words, and places the commands a data as serial packets on the VSYNC line to the monitor. A controller in the monitor receives the serial packets and controls adjustment circuitry in the monitor to adjust display characteristics according to the commands a data received. Adjustments include adjustments to brightness, contrast, display position on a monitor screen, display size and aspect ratio, and commands may include commands to switch display modes, and in some cases to signal the monitor to assume alternative power-using modes, such as a standby mode.

14 Claims, 2 Drawing Sheets

REMOTE CONTROL OF DISPLAY FUNCTIONS

CROSS REFERENCE TO RELATED APPLICATIONS

This is a continuation of application Ser. No. 08/181,884 filed Jan. 14, 1994, now abandoned.

FIELD OF THE INVENTION

The present invention is in the area of general-purpose computer systems, and pertains more specifically to apparatus and methods for remotely controlling functions of display monitors, such as Cathode Ray Tube (CRT) monitors.

BACKGROUND OF THE INVENTION

A display monitor is an important element of a general-purpose computer system, and accounts for a significant portion of the total cost of a system. The display monitor is the systems's principle user interface, and functions to provide information to a user in both graphic and text form.

Manufacturers of monitors are motivated to improve their products by improving characteristics such as resolution, contrast, and clarity. Over time, significant improvements have been made, but not without problems and expense.

The need to provide improved functionality in monitors has made state-of-the-art monitors complex devices, and in many instances the most expensive component of an overall computer system. For example, many monitors are provided with on-board, microprocessor-based controllers, including control routines for relatively complex operations like power management.

Conventional monitors typically have built-in control inputs for such things as brightness, contrast, picture position and sizing. These control inputs are typically rotary potentiometers, and may be mounted at different locations around the case of the monitor as determined by each manufacturer. They may be located on the front in plane with the display screen, on the side, in the back, or on top of the case, often behind a small panel a user may open to access the controls. Moreover, the controls for brightness and contrast may be located on a separate area of the case than positioning and sizing controls. Also, such controls may be digital or analog in design. There are few, if any, industry standards that dictate a user interface for such controls on monitors, and therefore there is a wide variety of locations and types of control input for such monitors.

In a cathode ray tube (CRT) monitor, the control inputs for contrast and brightness typically interact with video circuitry in the monitor, and modulate the signal by varying electrical potential to one or more control grids that effect the emissions from a cathode filament. The brightness control, for example, adjusts the level of the scanning electron beam, which in turn makes the on-screen images brighter or less bright. Contrast is the linear relationship between incoming video dot data signal strength 47 and the current screen brightness.

Besides brightness and contrast control inputs, there are also typically control inputs for position and sizing, which allow a user to alter the position of the display on the screen to some extent, and to adjust the height and width of the display area on the screen.

The control inputs described above must be accessed under several different circumstances. For example, at different times of day, and at night, the ambient light conditions may vary, requiring an adjustment in brightness. Moreover, brightness and contrast are typically somewhat interactive, so when one is adjusted it is usually expedient to adjust the other.

Making control inputs as described requires a user to reach to the monitor, sometimes to different locations around its case, to find the proper control. Moreover, the control inputs do not show adjustment limits or the present position or percentage of input.

What is clearly needed is an easier, more convenient method with suitable apparatus for adjusting display characteristics for a display monitor without having to access control input devices on the monitor. The new apparatus and method should provide for input at conventional input devices and transmit control settings and variances for adjusting display characteristics without requiring new apparatus at the host or in conventional connections between the host and the display.

SUMMARY OF THE INVENTION

According to embodiments of the invention, a general-purpose computer system having a CPU, a memory, input apparatus, a monitor, and a video adapter for providing color, VSYNC, and HSYNC signals to the monitor is provided with a unique monitor control adjustment system. The monitor control adjustment system has an input interface for a user to input desired monitor adjustments. There is also circuitry controllable by the CPU for converting the user inputs to digital commands and data, for monitoring pulses of the VSYNC signal, and for placing serial data packets representing the digital commands and data on the line carrying the VSYNC pulses, between instances of the VSYNC pulses. At the monitor, a controller receives the serial data packets and performs adjustments to display characteristics in response to the digital commands and data.

The controller in the monitor receives all signals from the host computer, strips the serial command packets from the VSYNC line, and provides the signals less the serial packets to conventional CRT circuitry. The controller adjusts the signals in some instances, and provides separate output signals in other instances to responsive circuitry to make the adjustments to display characteristics.

Adjustments may be made for brightness, contrast, position and size, including aspect ratio, for the display. Commands may also be sent to switch video modes and to signal the monitor to assume alternative power-using states.

The system according to various embodiments of the invention provides hands-free, user-friendly adjustments by eliminating the need for confusing manual controls on high-resolution monitors. Wear in conventional mechanical apparatus to make CRT display adjustments is also eliminated. A further advantage is that the invention can be practiced by loading unique control routines into exiting computers without any addition of hardware. The standard system video BIOS and video controller is used.

DESCRIPTION OF THE PREFERRED EMBODIMENTS

Figure 1:
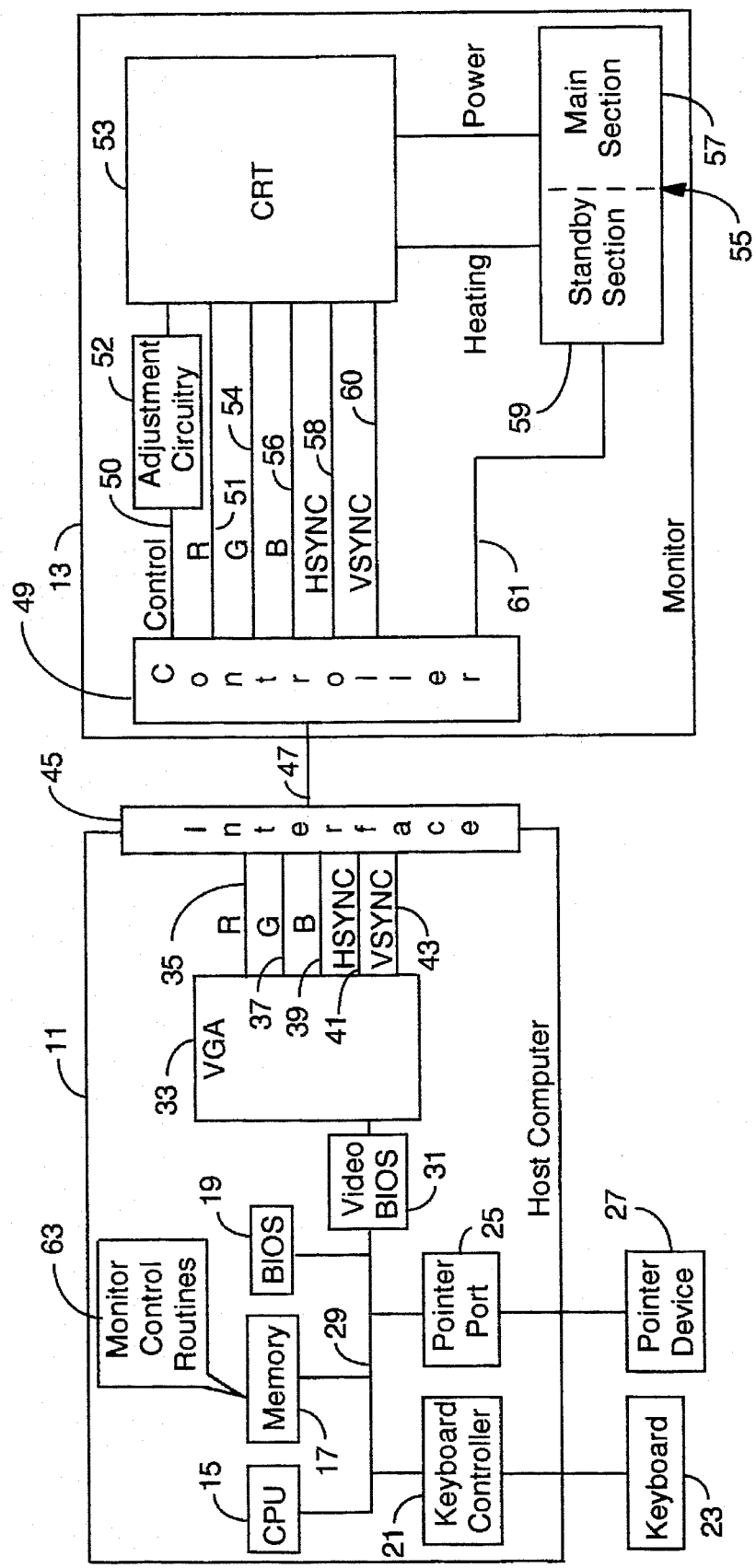
FIG. 1 is a block diagram of a host computer system connected to a CRT monitor, including remote control of display functions according to an embodiment of the present invention.

FIG. 1 is a simplified block diagram of a host computer system 11 connected to a CRT-type monitor 13, providing remote control of display functions according to an embodiment of the present invention. Host system 11 comprises a CPU 15 for managing computer functions, executing logic, and performing computations; a memory 17 for storing control routines and data; a basic input-output system (BIOS) 19, a keyboard controller 21 coupled to a keyboard 23; and a pointer port 25 coupled to a pointer device 27, which may be a trackball or a mouse, among other types of pointer devices.

The elements described above are bus connected by one or more bus structures represented by interconnecting bus 29, which also connects to video circuitry 33 through a video BIOS 31.

It is well known in the art that there are many variations in the architecture shown for the host computer system of FIG. 1, and the architecture shown is meant to be representative of conventional architecture in general. There are similarly many alternatives for the particular functional elements shown. For example, in FIG. 1 a keyboard 23 is illustrated as an input device, There are alternatives for input devices, such a touch screens, pen-pads, and the like, and such alternatives may be used in other embodiments of the invention. There are similarly several alternatives for pointer devices.

In the embodiment described relative to FIG. 1, video circuitry 33 is a VGA sub-system, which provides video dot data for a monitor as R, G, and B signals 35, 37, and 39, and also horizontal synchronization (HSYNC) signals 41 and vertical synchronization (VSYNC) signals 43, to a cable interface 45. These signals and ground connections are carried to monitor 13 conventionally by a VGA cable 47 in this embodiment, wherein the signals are carried on separate conductors.

The means of transmitting signals to the monitor is not limiting to the invention, as there are several ways this is conventionally accomplished, Transmission in other embodiments might be by composite video signal, for example, transmitted on a serial-type connection, or a composite signal might even be broadcast.

In the embodiment represented by FIG. 1 the VGA signals are received at the monitor by a controller 49 configured according to the invention. Controller 49 may comprise any one of several suitable, commercially available microcontrollers or microprocessors, or it may be a proprietary unit manufactured specifically for the purpose of controlling a display according to embodiments of the present invention. In the former case, in addition to the commercially available unit, there may be circuitry driven by outputs of the commercial microcontroller to provide suitable output signals to drive the necessary conventional CRT circuitry in making adjustments and the like.

Controller 49 operates on incoming signals in a manner described more fully below, and provides adjusted R, G, and B signals, and adjusted HSYNC and VSYNC signals on lines 51, 54, 56, 58, and 60 to a conventional CRT 53.

Controller 49 also in this embodiment provides control signals on line 50 to adjustment circuitry 52 to provide control of characteristics of a display on CRT 53, In some embodiments this circuitry may be a part of controller 49, Conventional CRT 53 in this embodiment is powered by a power supply 55 having a main section 57 and a standby section 59. A control connection 61 between controller 49 and power supply 55 allows the controller to shift the power supply from full power mode to a very low power standby mode, or to turn the power supply off altogether, In other embodiments there may be plural power modes controlled by controller 49 via link 61, including reduced filament heating power heating power off with other circuits at full power, and other combinations.

Control commands and data intended for controller 49 to accomplish control and video adjustment functions in the monitor are initiated by a user at user input devices coupled to host computer 11, in conjunction with control routines 63 shown as stored in memory 17.

Those with skill in the art will recognize that control routines according to embodiments of the invention may be provided to a host, stored, and accessed in a variety of ways. There may be, for example, a terminate-and-stay-resident (TSR) program activated by a hot-key sequence. Alternatively a user may call a program from an operating system (DOS, UNIX, Windows, and the like). Control routines may be resident on a mass storage device, although access time would be poor.

The mechanism for transmitting commands and data to controller 49 is by inserting a serial data pattern on the VSYNC line whenever there is a command and/or data to be sent. As is known in the art, the VSYNC signal is typically a pulse of short duration transmitted at a frequency that determines the frame rate for the display. For each instance of the VSYNC signal, a new scan of the display is initiated.

The period of the VSYNC signal varies depending on a number of factors, such as the clock rate of the computer system, the frequency of the monitor (if a CRT), and the resolution of the display. For the VGA system of FIG. 1 a typical VSYNC period is from 10 to 20 milliseconds.

Figure 2:
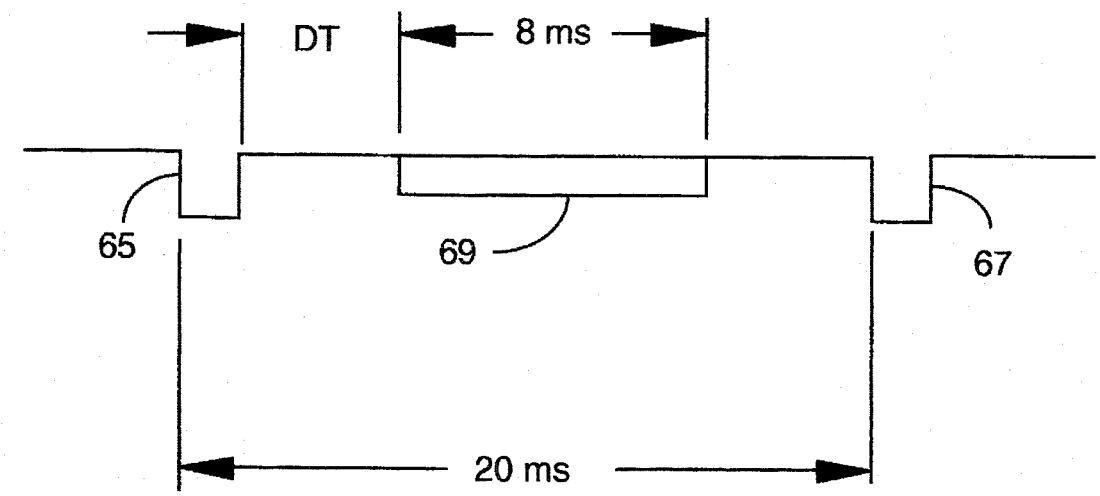
FIG. 2 is an illustration of signals on a VSYNC line in a connecting cable of FIG. 1.

FIG. 2 illustrates the VSYNC signal for the embodiment of FIG. 1, with a serial data packet inserted. Two VSYNC pulses 65 and 67 are shown at a period of 20 ms with a serial data packet 69 inserted having a total time of about 8 ms. The serial data pattern, although shown in FIG. 2 as a rectangular area, is a wave form over the 8 ms period transmitting a digital pattern in an analog fashion, as is known in the art. The same driver used for forming the VSYNC pulse is controlled to provide the serial data pattern.

In the embodiment of FIG. 1 the host system in combination with control routines 63 polls the vertical sync signal for every occurrence of the signal. Upon detecting the VSYNC signal, serial data pattern 69 is inserted on the VSYNC signal line at a set time DT (for delay time) after the instance of the VSYNC pulse. Depending on the period of the VSYNC signal, the delay time and the time duration of the serial data pattern inserted may be different than the times shown.

A serial pattern is inserted only if an input has been made by a user, and a digital command and/or data word is available in a ready register for transmission. For example, a user might desire to increase the brightness of the display. The user accesses an interface, which presents a display window with a scrolling element operable by a cursor controlled by a mouse. The system positions a token in the scrolling element indicating the current brightness setting in the adjustable range. The user may then drag the token as in known in the art with cursor control, to a new position in the scrolling field, indicating an increase in brightness.

In response to the user input, the host system prepares a command and data. The command is a digital value recognizable by controller 49 (FIG. 1) to increase brightness, and the data (which may be one or more digital values) indicates the amount of alteration to be made, or, alternatively, the new position in the total range to be assumed.

The host system, operating according to control routines 63, places the command and the data in a series of registers reserved for the purpose in memory. At the next polled VSYNC pulse, there being valid values in the reserved registers, the system, still following the dictates of routines 63, inserts the command on the VSYNC line. After the command is inserted, at following VSYNC pulses, the data is inserted. If there is more than one data word associated with the command, each is sent after following VSYNC pulses.

At monitor 13, controller 49 is configured to receive and recognize the commands and data inserted on the VSYNC line, and to act on the same to accomplish the desired alteration in display characteristic. In the present example, the brightness adjustment command is received and stored, the data is similarly received, and the controller responds by adjusting the brightness of the display according to the data value or values received.

As was described in the background section above, the conventional adjustments for video displays, in particular CRT displays, are brightness, contrast, position, and size. In the embodiment of FIG. 1, there are command words insertable on the VSYNC line for all four of these conventional adjustments, and data input interfaces for magnitude of adjustment to be made as well. But these four characteristics do not exhaust the uses of the system of the invention.

Besides the four adjustments described above, embodiments of the invention are provided for managing power levels for the monitor and for switching video mode. In the first instance, one or more commands are available for power management, such as to place the monitor in a standby mode, or to turn it off altogether. In alternative embodiments there may be just one, or more than one standby mode. For example, there may be intermediate standby levels for providing partial power to the filament heater, controlling the extent of warmup time required for subsequent operation, Another embodiment of the invention incorporates commands and data for switching video modes. In the VGA standard, for example, there can be 350, 400, or 480 lines per frame, Node switches may also be made from a text application to a graphics application, to provide for higher resolution for graphics, By sending commands directly to the controller in the monitor, the monitor can synchronize immediately, avoiding annoying blanking or flashing on the display screen, The commands and data impressed on the VSYNC line do not affect transmission or reception of the VSYNC signal to any conventional monitor circuitry, to a noticeable degree.

The system of various embodiments of the invention as described, replaces conventional analog and digital fine tuning adjusters on monitors giving the user hands-free operation. The control system circuitry within the monitor may interface in the same areas and methods as conventional digital or analog control adjusters but is not limited to those control parameters or areas. Through command/data inputs, an embodiment of the invention provides for small finite adjustments according to user preferences.

As described above, a user accesses the control routines in embodiments of the invention on the host 11, and the interface may take any one of several forms. There may be, for example, a pop-up menu with graphical interfaces; or there may be a command line syntax. The control routines may be activated by a hot-key as in a background driver, or by calling a stored program in the operating system such as Windows, DOS or UNIX, A topic-sensitive help menu may also be provided.

It will be apparent to those with skill in the art that it is possible to implement the invention in control routines written in a variety of ways, as it is well know in the art that individual programmers have individual preferences in choice of high level languages and programming techniques.

In the overall system configuration shown in FIG. 1, the host system differs from conventional systems in the combination with the control routines providing the functions described, and the user interface provided by the control routines on demand. The monitor differs from conventional monitors in controller 49, which is configured to monitor the VSYNC line and to receive and act upon command and data packets transmitted serially on the line in between VSYNC pulses. In the first instance, routines may be added to conventional equipment by the simple expedient of loading software, In the case of the monitor, upgrades may be made by adding premanufactured components to existing monitors, and by manufacturing original equipment monitors according to the invention, In yet another embodiment of the invention, commands and data are transmitted to change the intensity of video dot data to make small changes in image color tone.

It will be apparent to those with skill in the art that there are many changes that might be made without departing from the spirit and scope of the invention. Some of these alternatives have already been described, such as adjustment of various display functions, switching display modes, and adjusting the color tone of a displayed image, The system according to embodiments of the invention can switch directly between multiscanning oscillators within the monitor without interruption of the monitor's circuitry. Typically monitors detect interruptions before switching between oscillators with a slight intrinsic delay that blanks or flashes the screen.

In other embodiments of the present invention the command\data transmissions on the VSYNC line may be incorporated in other signal devices for alternative hands-free adjustment. The inclusion of a serial data pattern may be used to maximize any digital signal by using the blanking portion to benefit other performance parameters. Another embodiment of the invention may adjust an audio portion of a monitor that incorporates sound. Also, an additional embodiment invention may be provided to give an inexpensive digital monitor the ability to produce more colors by combining adjusted levels of R, G, B and Intensity. In another embodiment of the invention, the commands can fine tune monitor performance in areas of sharpness, color pixel separation, deflector alignment, and color convergence. Another embodiment incorporates command/data signals on the horizontal sync line between instances of the horizontal sync pulses.

What is claimed is:

1. In a computer system having a central processing unit (CPU), a memory, a monitor, and a video adapter providing signals to the monitor, a monitor control adjustment system comprising:

a dedicated vertical synchronization (VSYNC) line carrying timed VSYNC pulses and carrying no pixel data;

an input interface for a user to input information relative to desired monitor adjustments;

encoding circuitry controllable by the CPU; and an adjustment controller in the monitor;

wherein the encoding circuitry converts the input information into digital commands and data and encodes the commands and data as serial data packets on the dedicated VSYNC line between instances of the VSYNC pulse without regard to blanking time, and wherein the adjustment controller in the monitor receives and decodes the serial data packets and adjusts display characteristics of the monitor according to the commands and data received.

2. A monitor control adjustment system as in claim 1 wherein the display characteristics adjusted are one or more of display brightness, display contrast, display position, and display height and width.

3. A monitor control adjustment system as in claim 1 wherein display characteristics adjusted include monitor display modes.

4. A monitor control adjustment system as in claim 1 wherein the input interface comprises graphical displays on the monitor, having selection indicia to select adjustment modes and to input adjustment magnitudes for transmission to the adjustment controller in the monitor.

5. A monitor control adjustment system as in claim 1 wherein the monitor has at least one standby power mode, and the adjustment controller initiates alternative power modes in the monitor.

6. A cathode ray tube (CRT) monitor, comprising:

a receiving port for receiving video input from a remote host, the receiving port having a dedicated vertical synchronization (VSYNC) terminal carrying a VSYNC signal as timed pulses on a dedicated line and carrying no pixel data:

an adjustment controller connected to the receiving port; and adjustment circuitry coupled to the adjustment controller;

wherein the adjustment controller monitors the VSYNC line for serial data packets carried between instances of the timed VSYNC pulses without regard for blanking time, decodes the serial data packets as adjustment commands and data from the remote host, and controls the adjustment circuitry to adjust display characteristics of the monitor according to the commands and data received.

7. A cathode ray tube monitor as in claim 6 wherein the display characteristics adjusted are one or more of display brightness, display contrast, display position, and display height and width.

8. A cathode ray tube monitor as in claim 6 wherein the display characteristics adjusted include monitor display modes.

9. A cathode ray tube monitor as in claim 6 wherein the monitor has at least one standby power mode, and the adjustment controller initiates alternative power modes in the monitor.

10. A method for making adjustments to display characteristics for a monitor comprising steps of:

(a) providing input particular to desired adjustments at a user interface of a computer connected to the monitor;

(b) converting the input to digitally represented commands and data;

(c) inserting the digital commands and data as serial data packets on a dedicated conductor carrying a vertical synchronization (VSYNC) signal as timed pulses, wherein the dedicated conductor carries no pixel data, and wherein the serial data packets are inserted between instances of the timed VSYNC pulses and without regard to blanking time;

(d) receiving the serial data packets at an adjustment controller in the monitor;

(e) providing output signals by the adjustment controller in response to the commands and data received in the serial data packets; and (f) adjusting the display characteristics by adjustment circuitry in the monitor in response to the output signals from the controller.

11. The method of claim 10 wherein the display characteristics adjusted are one or more of display brightness, display contrast, display position, and display height and width.

12. The method of claim 10 wherein display characteristics adjusted include monitor display modes.

13. The method of claim 10 wherein the user interface comprises graphical displays on the monitor, having selection indicia to select adjustment modes and to input adjustment magnitudes for transmission to the adjustment controller in the monitor.

14. The method of claim 10 wherein the monitor has at least one standby power mode, and the adjustment controller initiates alternative power modes in the monitor.

* * * * *